United States Patent [19]

Sakurai et al.

[11] Patent Number: 5,506,410

[45] Date of Patent: Apr. 9, 1996

[54] CORDLESS MOVABLE APPARATUS USING OPTICAL SPATIAL TRANCEIVERS

[75] Inventors: Tsutomu Sakurai, Ikoma; Sinji Kaino, Hirakata, both of Japan

[73] Assignee: Matsushita Electric Industrial Co., Ltd., Osaka, Japan

[21] Appl. No.: 243,401

[22] Filed: May 16, 1994

[51] Int. Cl.⁶ .................................................. G02B 27/00
[52] U.S. Cl. ........................ 250/551; 250/227.11; 29/740
[58] Field of Search ............................ 29/720, 721, 740; 901/16, 47, 35; 250/551, 227.11, 227.21, 227.22, 221, 221.1, 234, 235, 561, 559.29; 356/445; 414/749, 750

[56] References Cited

U.S. PATENT DOCUMENTS

| | | | |
|---|---|---|---|
| 4,236,255 | 11/1980 | Burgener et al. | 455/603 |
| 4,738,025 | 4/1988 | Arnold . | |
| 4,973,216 | 11/1990 | Domm | 414/744.5 |
| 4,979,290 | 12/1990 | Chiba . | |
| 4,980,971 | 1/1991 | Bartschat et al. . | |
| 5,084,962 | 2/1992 | Takashashi et al. . | |
| 5,096,353 | 3/1992 | Tesh et al. | 414/225 |
| 5,172,468 | 12/1992 | Tanaka et al. | 29/721 |
| 5,233,745 | 8/1993 | Morita . | |
| 5,396,078 | 3/1995 | Klaus et al. | 250/551 |

Primary Examiner—Edward P. Westin
Assistant Examiner—Stephen Calogero
Attorney, Agent, or Firm—Wenderoth, Lind & Ponack

[57] ABSTRACT

A cordless movable apparatus includes a stage having a slide surface, a movable head for moving on the slide surface of the stage and holding a processing device, a movable head driving device for driving the movable head, and optical spatial transceivers for projecting and receiving light therebetween along an optical axis parallel to the direction of movement of the movable head so as to conduct signal transmission in a cordless manner. One of the transceivers is provided on the movable head and is electrically connected to the processing device. The other of the transceivers is provided on the stage and is electrically connected to an external device.

13 Claims, 11 Drawing Sheets

CORDLESS MOVABLE APPARATUS USING OPTICAL SPATIAL TRANCEIVERS

BACKGROUND OF THE INVENTION

The present invention relates to a cordless movable apparatus which transmits a signal between fixed and movable parts in a cordless manner.

FIG. 20 shows the structure of a conventional chip mounting apparatus. A movable part of the apparatus consists of twin orthogonal robots with several hundred cables wired to a movable head 1 via a bare cable conveyor 2 and a flexible mechanical part 3.

Due to the limited life of the wiring of the movable part, 80% of the problems in the apparatus are considered to result from the disconnection of the wires.

Meanwhile, in accordance with the recent development of intelligent equipment, it is not uncommon to mount several tends to several hundreds of sensor actuators in the movable part. That is, several hundred to several thousand wirings are installed in the equipment. The weight, space occupied by and/or mechanical tension of the wires are drawbacks necessitating a large motor and rendering the equipment bulky. In fact, the weight of the equipment is so large, and employs a motor with such a larger power output, that a chip which is smaller than a grain of rice is typically handled by equipment that must weigh several tons.

SUMMARY OF THE INVENTION

The object of the present invention is, therefore, to provide a cordless movable apparatus which can transmit a signal between fixed and movable parts without any signal wiring.

In accomplishing these and other objects, according to one aspect of the present invention, there is provided a cordless movable apparatus comprising: a stage having a slide surface; a movable head for moving on the slide surface of the stage and holding a processing device; a movable head driving device for driving the movable head; and optical spatial transceivers for projecting and receiving light therebetween along an optical axis parallel to the direction of movement of the movable head so as to conduct signal transmission in a cordless manner. One of the transceivers is provided on the movable head and electrically connected to the processing device. The other of the transceivers is provided on the stage and electrically connected to an external device.

According to another aspect of the present invention, there is provided a cordless movable apparatus comprising: a first stage having a slide surface extended along a first direction; a first movable head for moving on the slide surface of the first stage in the first direction and holding a processing device; a first movable head driving device for driving the first movable head; a second stage having a slide surface extending along a second direction intersecting the first direction; a second movable head for holding the first stage and moving on the slide surface of the second stage in the second direction; a second movable head driving device for driving the second movable head; a first optical spatial transceiver provided on the first stage and electrically connected to the processing device, for projecting and receiving light; a second optical spatial transceiver provided on the second stage and electrically connected to an external device, for projecting and receiving light; and a light guide member provided on one of the first stage and the second movable head. The first optical spatial transceiver and the light guide member are provided on an optical axis parallel to the first direction so as to transmit light therebetween. The second optical spatial transceiver and the light guide member are provided on an optical axis parallel to the second direction so as to transmit light therebetween. Accordingly, signal transmission in a cordless manner is conducted between the first and second optical spatial transceivers through the light guide member.

BRIEF DESCRIPTION OF THE DRAWINGS

These and other objects and features of the present invention will become clear from the following description of the preferred embodiments thereof made with reference to the accompanying drawings, in which.

DETAILED DESCRIPTION OF THE PREFERRED EMBODIMENTS

Figure 1:
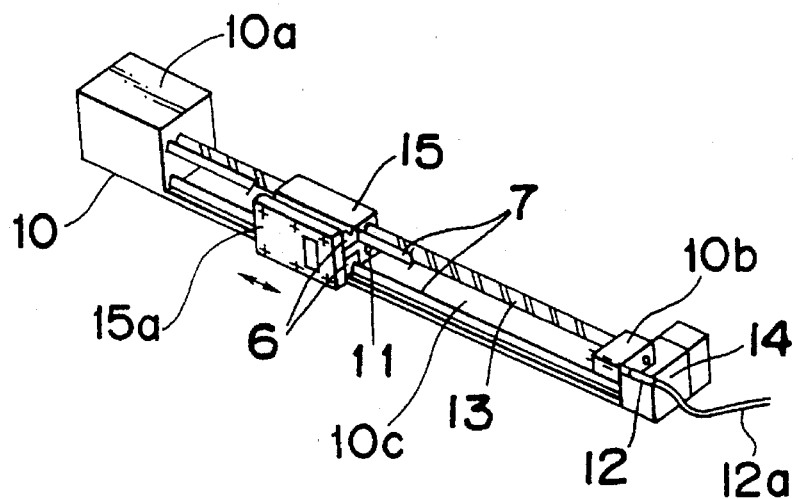
FIG. 1 is a perspective view of a first embodiment of a cordless movable apparatus according to the present invention.

Before the description of the present invention proceeds, it is to be noted that like parts are designated by like reference numerals throughout the accompanying drawings.

A first embodiment of a cordless movable apparatus according to the present invention will be described with reference to FIGS. 1–3.

In FIG. 1, a uniaxial linear cordless stage 10 has a ball screw 13 rotatably supported by supporting portions 10a and 10b, a motor 14 directly coupled to one end of the ball screw 13 to drive it, and a movable head 15 which is engaged with the ball screw 13 and smoothly slides on the surface 10c of the stage 10. The head 15 can hold a processing device 60 (see FIG. 3) such as a tool or robot on its base 15a. When the motor 14 drives the ball screw 13, the head 15 moves on the surface 10c of the stage 10 along the axis of the ball screw 13 without any rotation of the head 15.

A movable optical spatial transceiver 11 electrically connected to the processing device 60 is provided on one side surface of the head 15 to move along the axis of the ball screw 13 together with the head 15. A fixed optical spatial transceiver 12 electrically connected to an external device (not shown) through an optical fiber 12a is provided on the supporting portion 10b, the movable and fixed transceivers 11 and 12 being provided on the same optical axis and facing each other. The optical axis is parallel to the axis of the ball screw 13 as shown in FIG. 2. Thus, even if the head 15 is located at any position along the ball screw 13, light made up of signals and emitted from one of the movable and fixed transceivers 11 and 12 parallel to the ball screw 13 can be received by the other of the transceivers without any wiring. Each transceiver 11 and 12 converts the received light into electric signals and sends the signals to a processing device or external device, and converts electric signals sent from the processing device or external device into optical signals that make up the emitted light. Therefore, the first embodiment realizes multi-directional communications even when the transceiver 11 is moved. According to the first embodiment, since the optical path of the light is located within an area over which the head 15 can be moved and where no disturbance is located, the transmission of light between the movable and fixed transceivers 11 and 12 is not prevented by any object and the apparatus can be compact.

A second embodiment of the present invention will be described with reference to FIG. 4.

A cordless movable apparatus according to the second embodiment has a pair of uniaxial linear cordless stages 16 used to move a uniaxial linear cordless stage 10, similar to that of the first embodiment, in the Y-direction perpendicular to the X-direction in which the uniaxial linear cordless stage 10 moves. Although two uniaxial linear cordless stages 16 are shown, the second embodiment can employ only one such stage and accordingly, the following description will be directed only to one uniaxial linear cordless stage 16. The fixed optical spatial transceiver 12 is secured to one supporting portion 16b of the stage 16, and a reflecting mirror 20 is provided for reflecting light 4 by 90° between the movable and fixed transceivers 11 and 12. The mirror 20 serves as a light guide member for guiding light from one transceiver to the other.

In the embodiment described above, the light projected from one of the optical spatial transceivers 11 and 12 is always detected by the other via the reflecting mirror 20 without fail while the transceiver 11 is at any position. Therefore, the light can be transmitted between the optical spatial transceivers 11 and 12 in a cordless manner.

Figure 5:
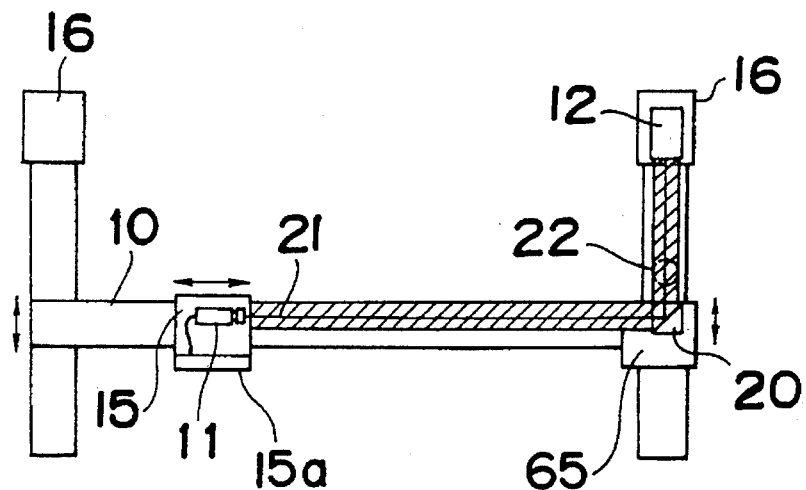
FIG. 5 is a plan view of a fourth embodiment of a cordless apparatus according to the present invention.

FIG. 5 illustrates a third embodiment of the present invention.

The third embodiment of the cordless movable apparatus according to the present invention has a structure similar to that of the second embodiment except that the movable transceiver 11 has a small aperture and projects light 21 of a small diameter while the fixed transceiver 12 has a large aperture and projects light 22 of a large diameter. FIG. 5 is a plan view of the apparatus. The light 21 of the small diameter projected from the movable transmitter 11 is reflected at the reflecting mirror 20 and detected by the fixed transceiver 12 through its large aperture. On the other hand, the light 22 of the large diameter emitted from the fixed transceiver 12 is reflected by the reflecting mirror 20 to be received by the movable transceiver 11 through its small aperture.

Accordingly, even when the perpendicularity of the uniaxial stages 10 and 16 is more or less off to some degree, or even if the optical axis is displaced slightly due to the vibration of the apparatus or the like, signals can be transmitted stably. Moreover, a miniaturized optical spatial transceiver 11 can be mounted to the movable head 15 and consequently, the movable head 15 can be lightweight.

A fourth embodiment of the present invention will be described with reference to FIG. 6.

Figure 4:
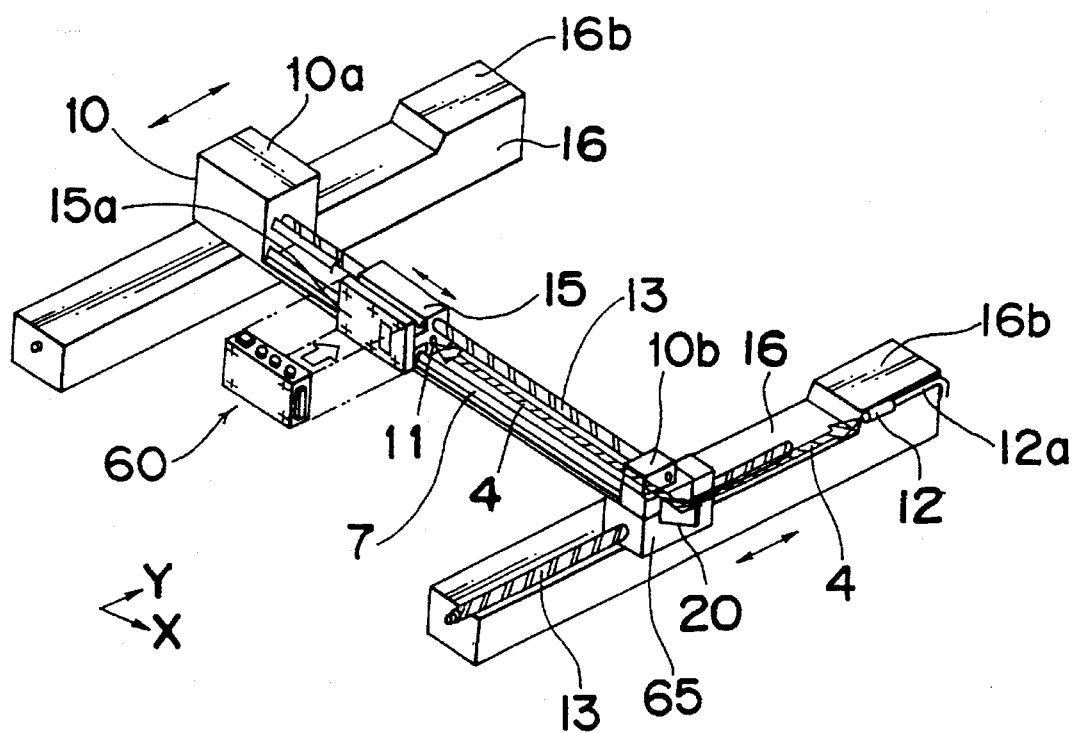
FIG. 4 is a perspective view of a second embodiment of a cordless movable apparatus according to the present invention.
Figure 6:
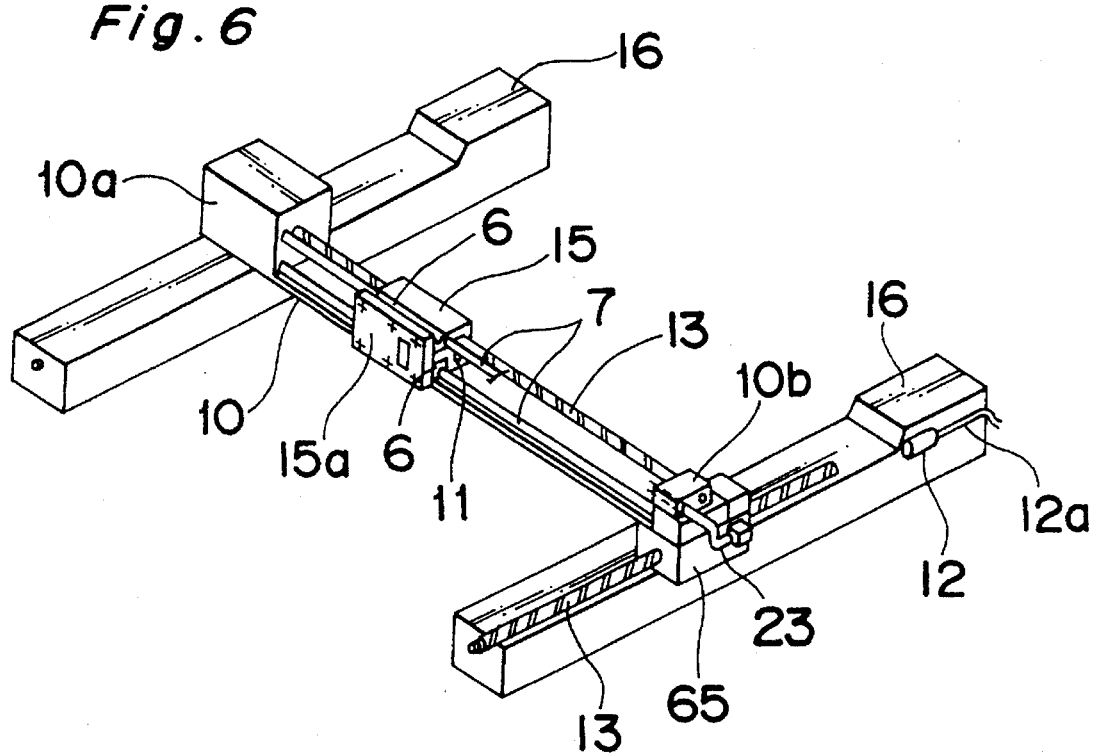
FIG. 6 is a perspective view of a fourth embodiment of a cordless movable apparatus according to the present invention.
Figure 7:
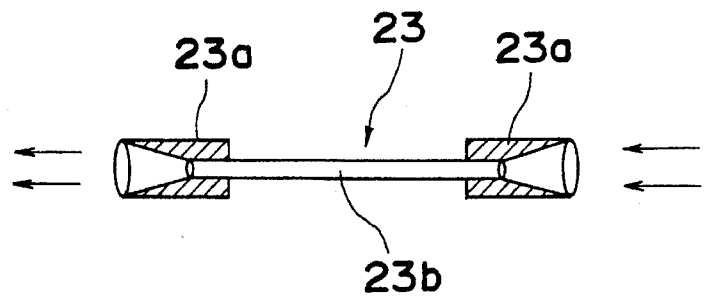
FIG. 7 is a cross-sectional view of the waveguide of the apparatus shown in FIG. 6.

The fourth embodiment shown in FIG. 6 is different from the second embodiment shown in FIG. 4 in that an optical waveguide 23 comprising a collimator fiber is provided, as a light guide member, instead of the reflecting mirror 20 so as to relay the light. The waveguide 23 has two guide members 23a and an optical fiber 23b connecting the guide members 23a with each other. Each of the guide members 23a has a tapered inner surface for smoothly receiving light as shown in FIG. 7. This design obviates any necessity of adjusting the mounting position or inclination of the reflecting mirror employed by the previously described embodiments.

Figure 9:
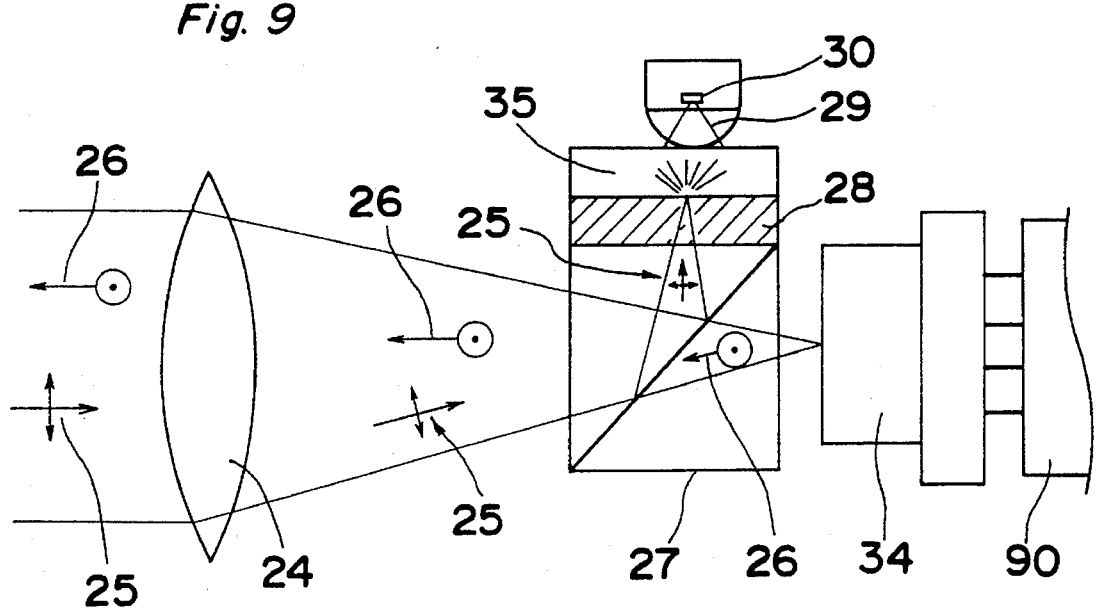
FIG. 9 is an enlarged side view of the transceiver shown in FIG. 8.
Figure 8:
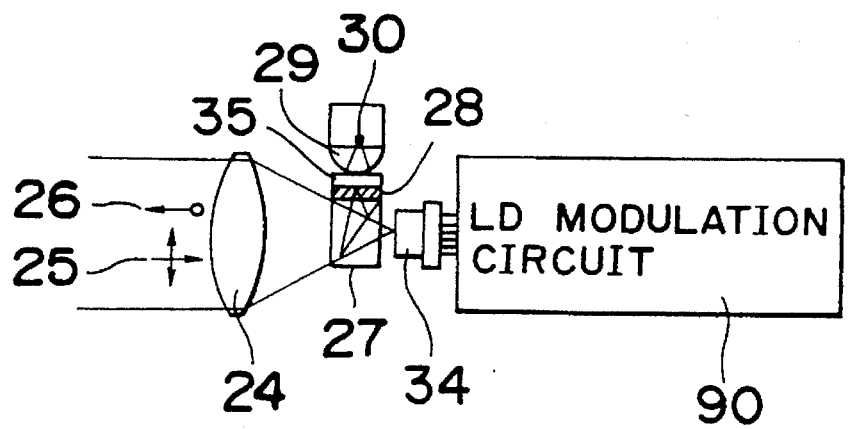
FIG. 8 is a side view of an example of the optical spatial transceiver of the apparatus.

One example of each of the transceivers 11 and 12 is shown in FIGS. 8 and 9. Each of the transceivers 11 and 12 has a light receiving unit and a light projecting unit.

The light receiving unit includes a convex collimator lens 24 through which the light passes; a deflecting beam splitter 27 for deflecting the light entering the unit through the collimator lens 24; a diffusion panel 28, such as a ground glass, for scattering the deflected light; an optical filter 35, such as a bandpass filter, for allowing light of only a specified wavelength to pass therethrough to increase a signal-to-noise ratio of disturbance light; a condenser lens 29 for condensing the scattered light; and a photodetector 30, such as a photodiode, for receiving the condensed light. With the above-described light receiving unit, light 25 propagating parallel to the surface of the sheet of FIG. 8 or 9 and entering the convex collimator lens 24 is reflected by the deflecting beam splitter 27. The deflected light is scattered by the diffusion panel 28 through the optical filter 35, and condensed again by the condenser lens 29 and received by the photodetector 30. Even when the to-be-detected deflected light 25 is inclined by some degree to the optical axis of the collimator lens 24, the light is defocused by the diffusion panel 28. Therefore, the amount of light incident upon the photodetector 30 remains high, thereby ensuring a stable detection of the light. The optical filter 35 can be omitted.

The light projecting unit includes a semiconductor laser (LD) 34, such as a photodiode, for projecting light; and an LD modulation circuit 90 for controlling the laser 34. Regarding the operation of the light projecting unit, the light 26 is emitted from the semiconductor laser 34, passes through the deflecting beam splitter 27, and is projected to the outside as parallel beams by the collimator lens 24.

Figure 11:
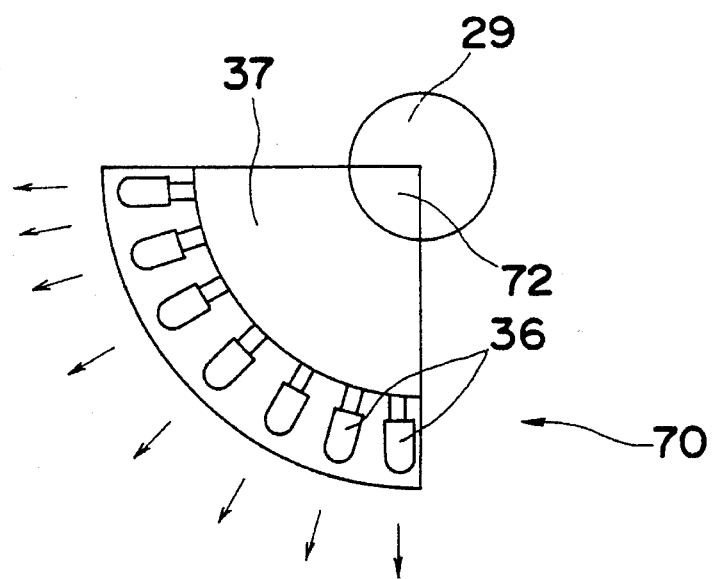
FIG. 11 is an enlarged plan view of the transceiver shown in FIG. 10.
Figure 12:
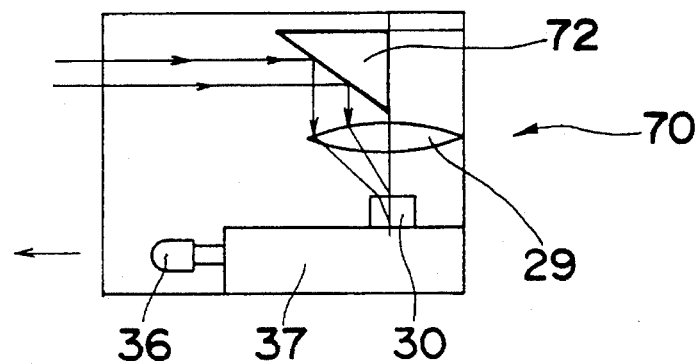
FIG. 12 is an enlarged side view of the transceiver shown in FIG. 10.
Figure 15:
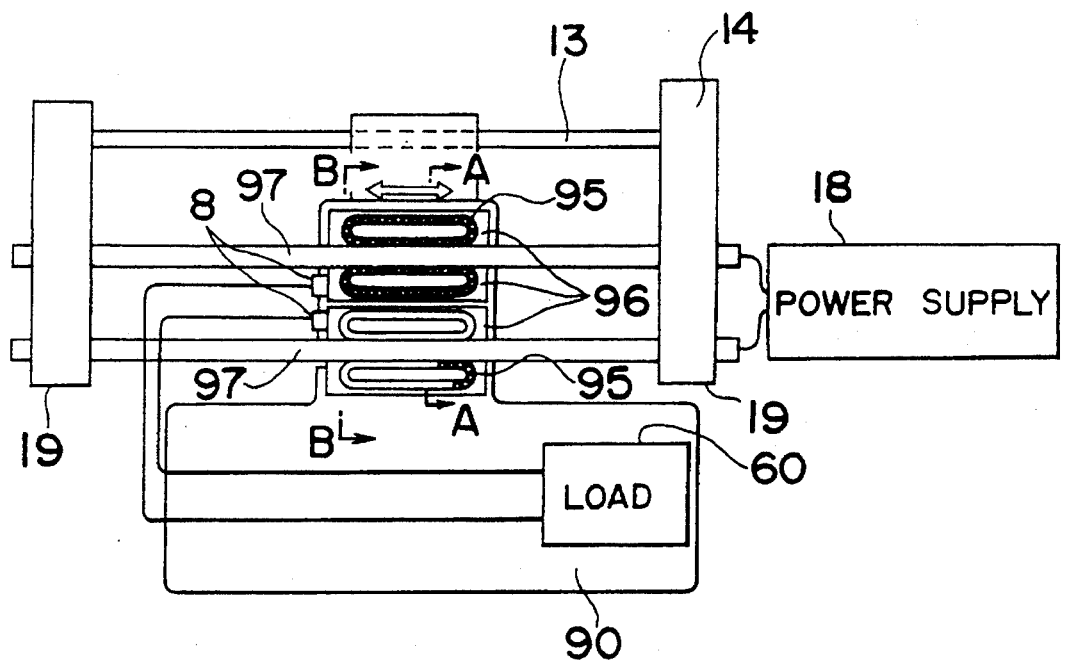
FIG. 15 is a side view, partially in section, of a mechanism for supplying electricity to a tool attached to a head of the apparatus.

Another example of the transceiver will be described with reference to FIGS. 10–12.

Figure 10:
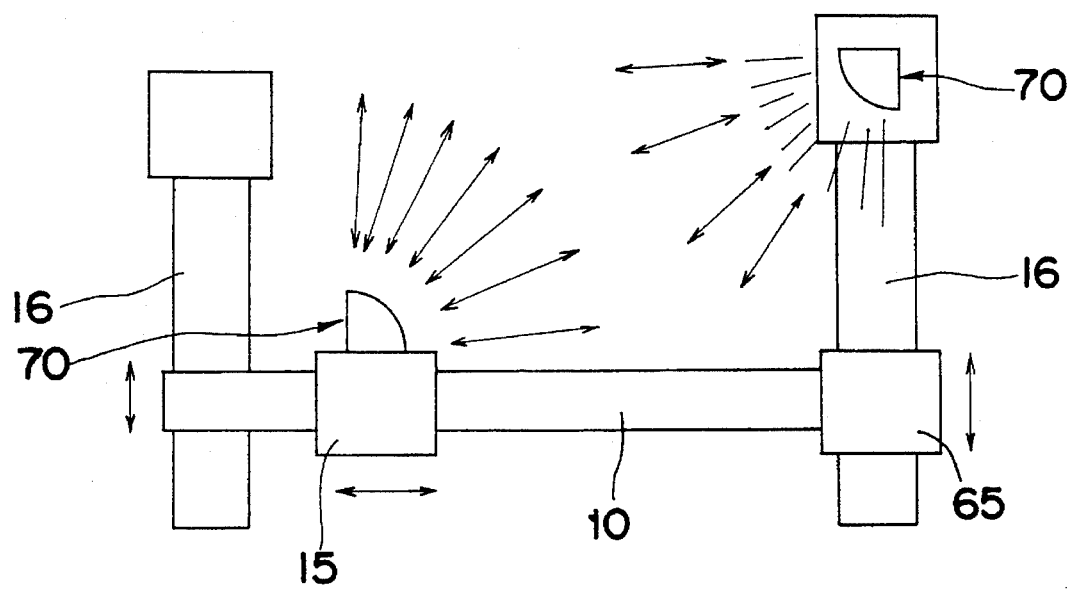
FIG. 10 is a schematic diagram of another example of the optical spatial transceiver of the apparatus.

In the cordless movable apparatus shown in FIG. 10, one transceiver is provided on the movable head 15, and the other transceiver 70 is fixed to the supporting portion 16b of one of the stages 16.

The light projecting unit of each transceiver 70 has a plurality of light emitting elements 36 such as light emitting diodes (LEDs) or laser diodes (LDs) arranged at regular intervals along an arcuate region of 90 degrees or more, and a modulating circuit 37 for controlling the elements 36. Thus, the light emitted from the elements 36 is projected over an angle of 90 degrees or more.

The light receiving unit of each transceiver 70 includes a cone mirror 72 subtending an angle equal to or more than 90 degrees, a condenser lens 29, and a photodetector 30. The light entering the unit 70 is reflected by the cone mirror 72 at about a right angle. The reflected light is condensed by the condenser lens 29 and received by the photodetector 30. The region of the cone mirror 72 of one transceiver 70 that is receiving the light is always located within the region over which the light is emitted by the elements 36 of the other transceiver 70. In this way, the movable and fixed transceivers 70 always transmit and receive signals, which make up the light, in a cordless manner.

Moreover, the light is projected from one of the movable and fixed optical spatial transceivers 70 directly to the other transceiver for detection when the movable transceiver 70 is located at any position. Thus, it is unnecessary to provide a mirror or a waveguide and accordingly, to adjust the position and/or the optical axis of the mirror and the transceivers.

Figure 13:
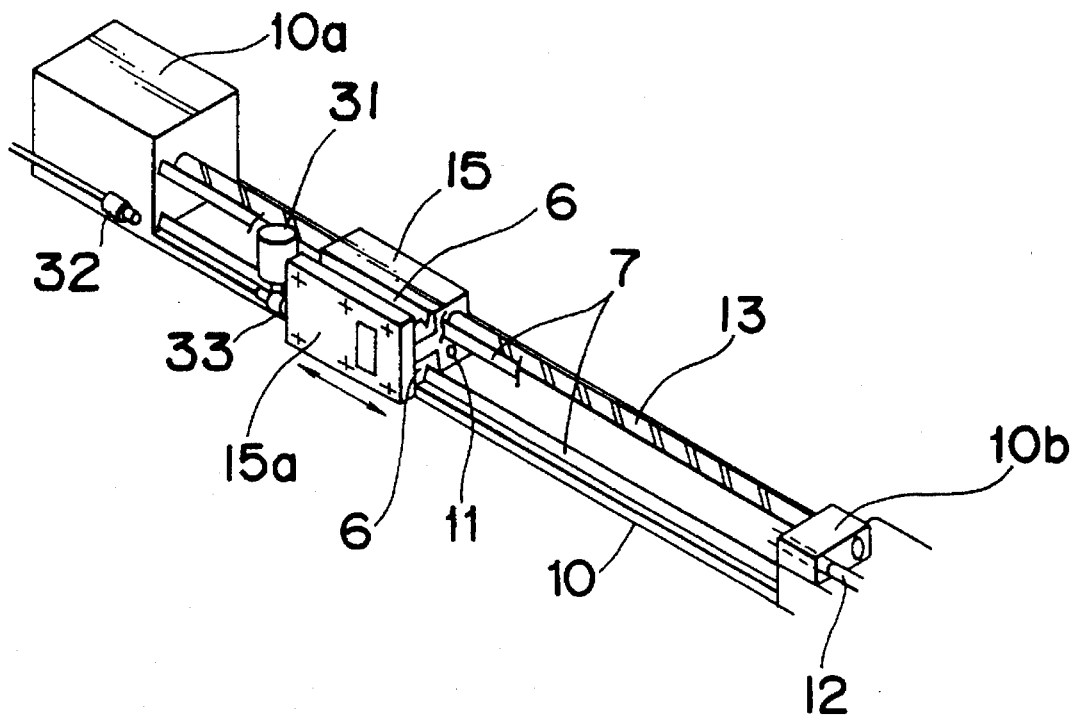
FIG. 13 is a perspective view of a cordless air supply mechanism.

FIG. 13 shows an example of a cordless air supply mechanism.

Figure 2:
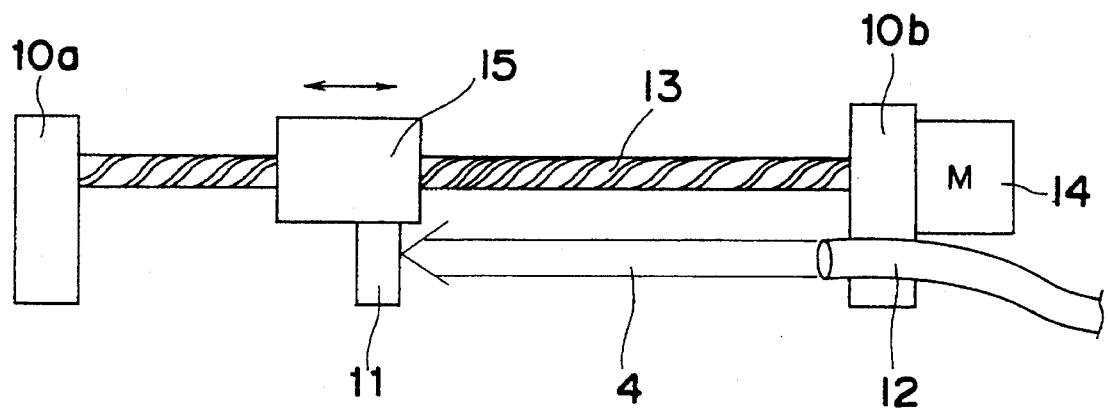
FIG. 2 is a schematic diagram of the apparatus shown in FIG. 1.

FIG. 13 shows a case where the mechanism adopts the embodiment of FIG. 2. The supporting portion 10a of the stage 10 has an air plug 32 for supplying air to an accumulator 31. The movable head 15 supports the accumulator 31, which serves as an air tank, and a plug receptacle 33 having a check valve for accepting the air from the air plug 32 without creating a leak. The air plug 32 is controlled so as to supply the air when the head 15 is located at a standby position close to the supporting portion 10a of the stage 10. Accordingly, it is not necessary to connect wiring, for effecting the supply of air, to the movable head 15, that is, a cordless air supply mechanism is realized.

As another example of a cordless air supply mechanism, an air pump can be provided in place of the accumulator 31 and the receptacle 33. The air supplied from the air plug 32 to the air pump can be supplied from the air pump to a tool attached to the head 15.

Next, a mechanism by which electricity is supplied in a cordless manner between the stage and the movable head will be described with reference to FIGS. 1–6.

Figure 3:
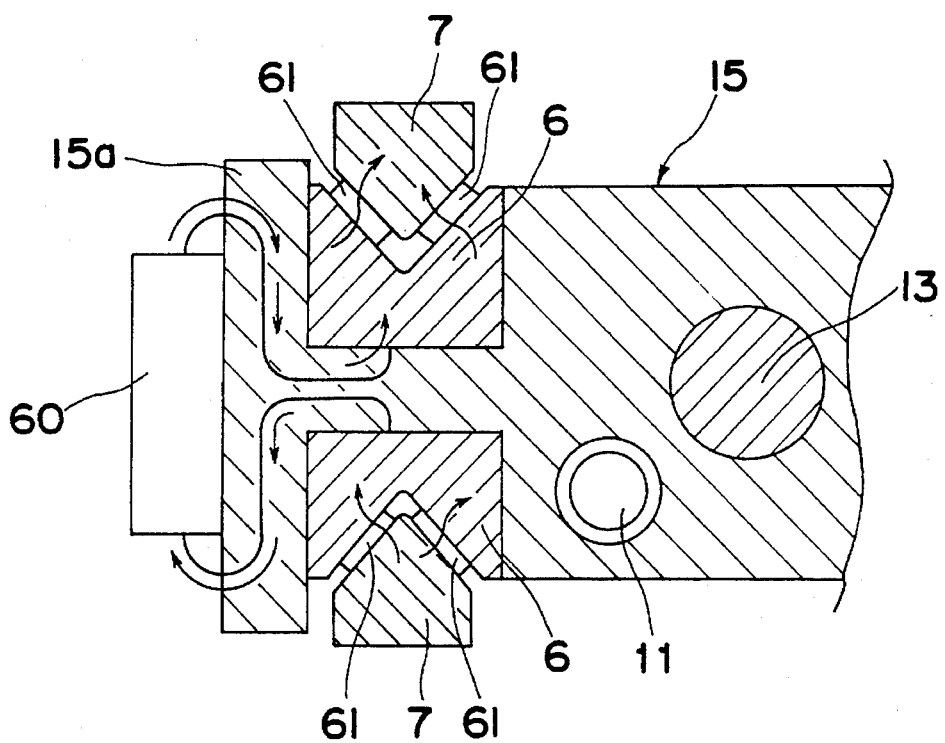
FIG. 3 is a cross-sectional view of the apparatus shown in FIG. 1.

In FIG. 3, the movable head 15 has two bearings at its upper and lower surfaces. Each bearing has a plurality of conductive rollers 61 serving as conductive rolling elements, conductive roller retainers 6 provided on the head 15, and conductive rods 7 fixed to the stage 10. The plurality of conductive rollers 61 are rotatably supported on the inclined surfaces defining a V-shaped groove of each conductive roller retainer 6 while electroconductively and physically contacting the retainer 6, and are arranged at regular intervals along the groove. Each rod 7 is disposed on the rollers 61 so as to be smoothly guided along the groove of the retainer 6 while the rod 7 electroconductively and physically contacts the rollers 61. The movable head 15 is made of electrically insulative material. The retainers 6, the rods 7, and the rollers 61 are made of conductive material. The retainers 6 are electrically connected to terminals of the processing device 60 attached to the base 15a of the head 15. The rods 7 are electrically connected to terminals of an electric power supply accommodated in the supporting portion 10b. Therefore, the electricity is supplied to the processing device 60 through the rods 7, the rollers 61, and the retainers 6 when the head 15 is located at any position. The rollers 61 can be replaced by balls plated with electrically conductive chrome and having a diameter of 1 mm or more.

Figure 14:
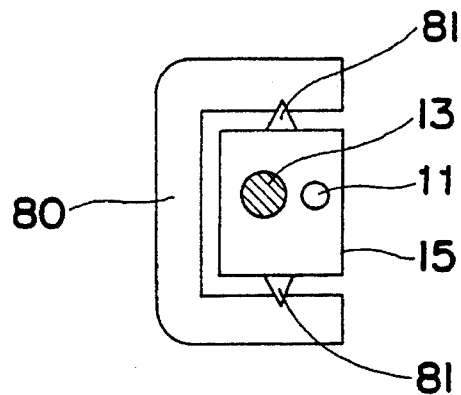
FIG. 14 is a cross-sectional view of a mechanism that supplies electricity to the apparatus in a cordless manner.

Alternatively, as shown in FIG. 14, conductive members 81 can be fixed to the head 15, and a C-shaped conductive retainer 80 can be provided on the stage 10. The retainer 80 is made of electrically insulative material except at contact portions at which the retainer contacts the rods 81 so that the rods 81 can be electrically connected to the power supply.

Next, another mechanism by which electricity is supplied between the stage and the movable head in a cordless manner will be described with reference to FIGS. 15–18.

Figure 16:
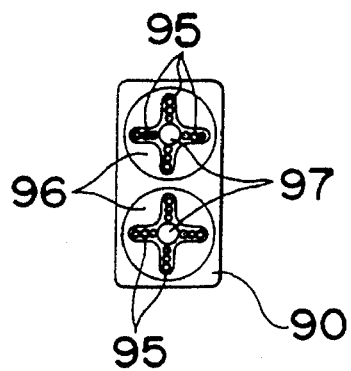
FIG. 16 is a sectional view taken along line B—B in FIG. 15.
Figure 17:
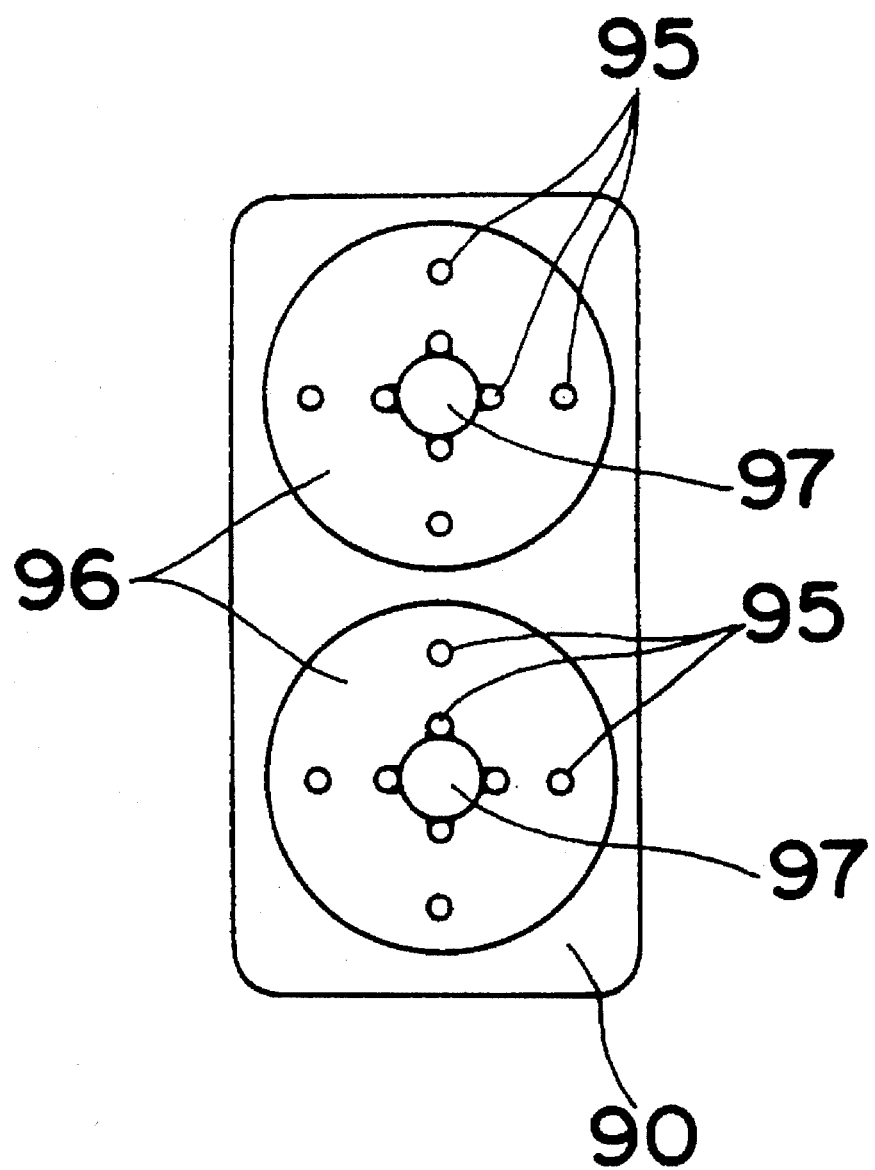
FIG. 17 is a sectional view taken along line A—A in FIG. 15.
Figure 18:
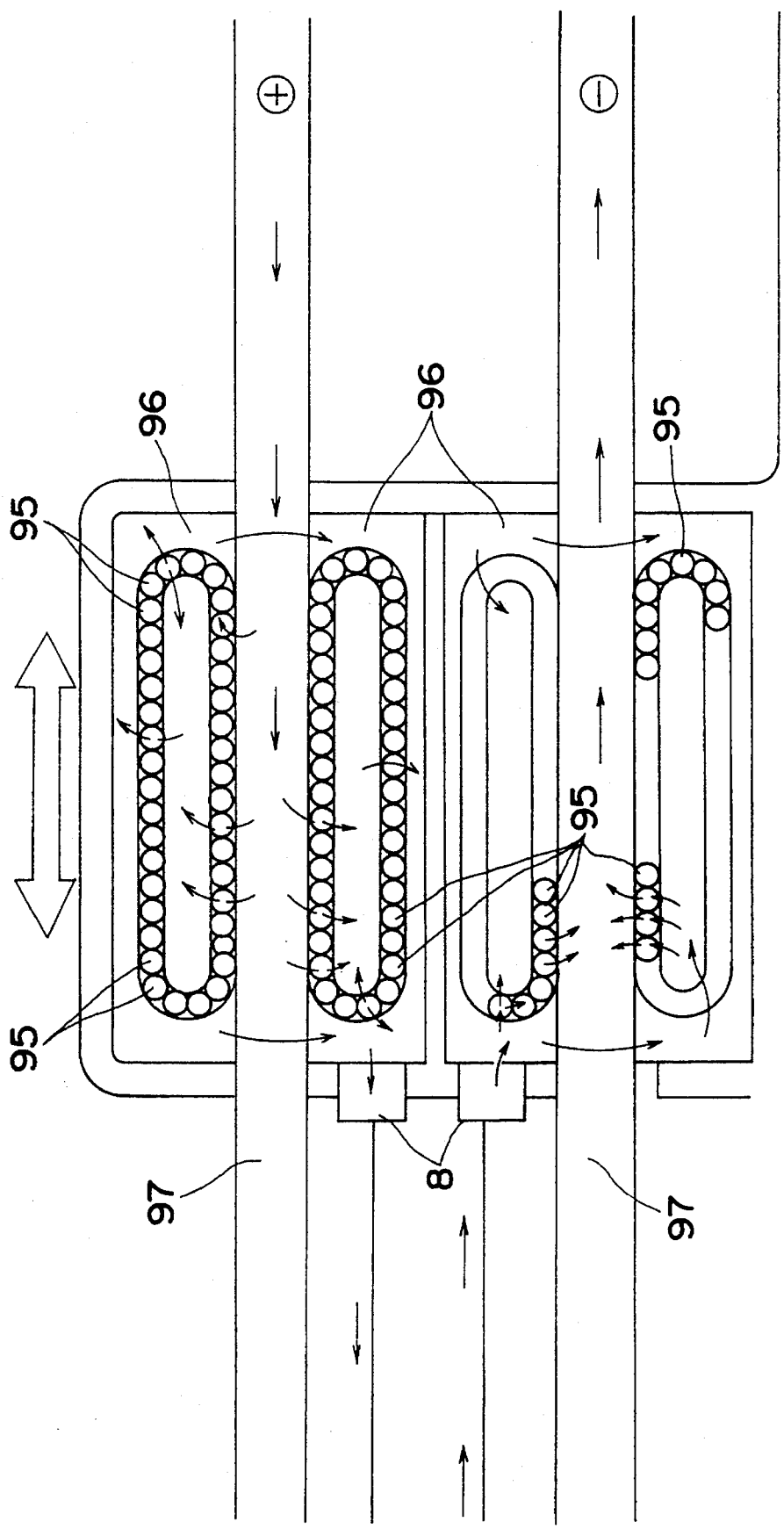
FIG. 18 is an enlarged side view of the mechanism shown in FIG. 15.

In FIGS. 15–18, a plurality of conductive rollers 95 serving as conductive rolling elements are held in each conductive roller retainer 96 incorporated within a movable head 90 made of electrically insulative material. Each retainer 96 has four approximately elliptical grooves as shown in FIGS. 16 and 17. Respective groups of the conductive rollers 95 are kept in contact with and rolling along a conductive rod 97. The rods 97 are supported by two blocks 19 on the stage 10 and are electrically connected to a power supply 18. The head 90 is moved by the same head moving mechanism shown in FIG. 1. The rollers 95 in the four grooves physically contact the rod 97 so as to be electroconductively connected to each other. The electricity fed to the conductive rods 97 from the power source 18 is transmitted to the conductive retainers 96 through the rollers 95 and is taken out through outlet terminals 8 of the retainers 96. Since there are a plurality of rollers 95, some of the rollers 95 are always in contact with the conductive rod 97 and the retainer 96 so as to suppress the generation of sparks, whereby electricity is conducted stably and the life of the rollers 95 is remarkably prolonged. Furthermore, there is only a small amount of friction produced in the mechanism owing to the use of the rolling elements. The outlet terminals 8 are electrically connected to the processing device 60 of a tool, for example, attached to the base 15a of the head 15. Accordingly, the electricity of the power supply 18 is supplied from the rods 97 to the retainers 96 through the rollers 95 and hence, to the processing device 60, in a cordless manner.

Figure 19:
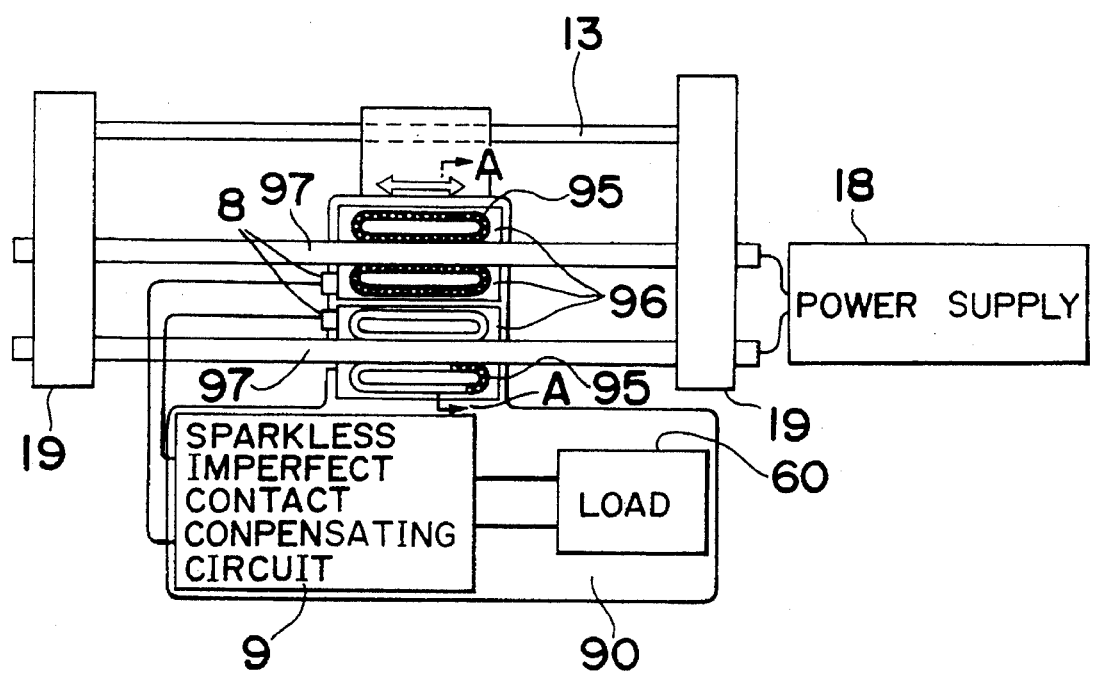
FIG. 19 is a side view, partially in section, of another mechanism for supplying electricity to a tool attached to the head of the apparatus.
Figure 20:
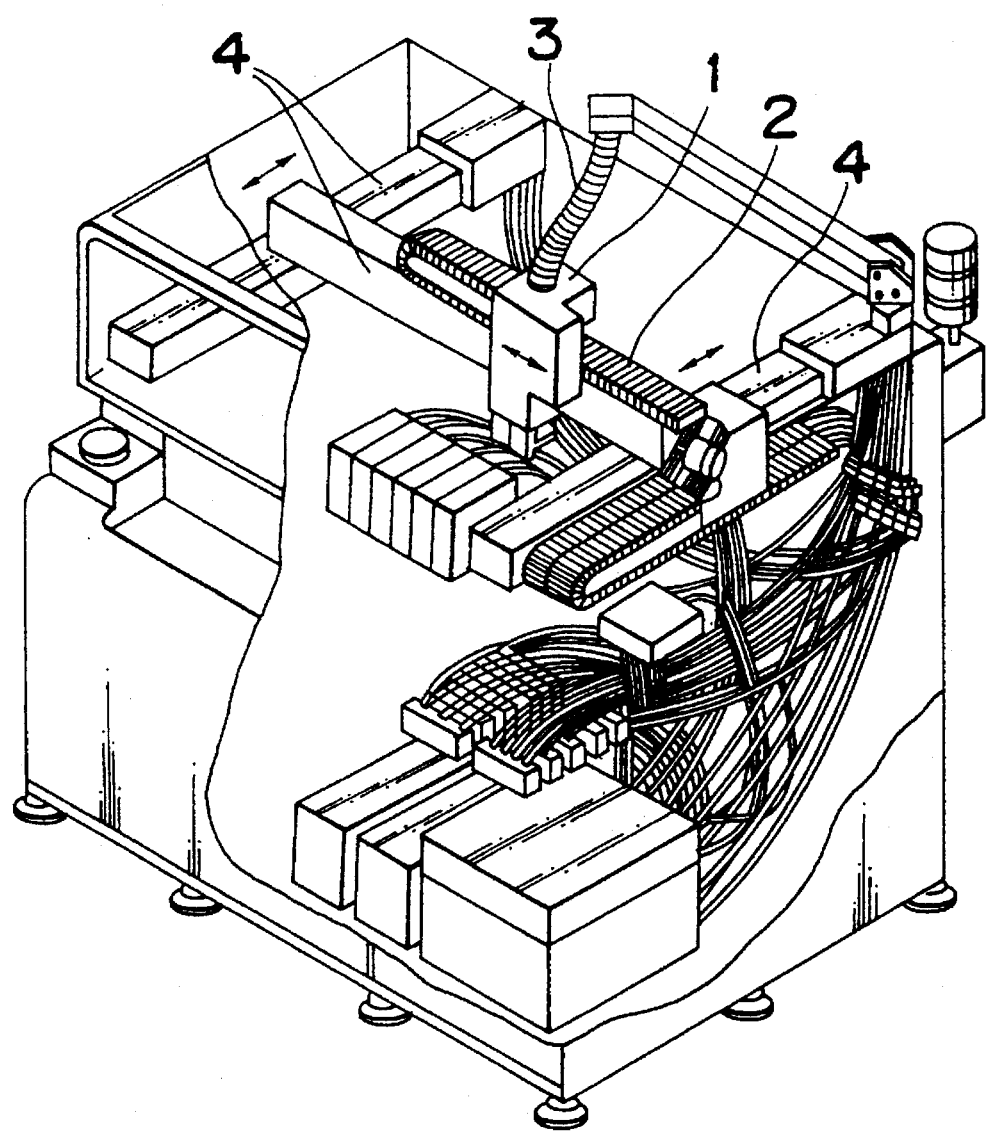
FIG. 20 is a partially cutaway view of a chip mounting apparatus having a conventional XY stage.

The above-described mechanism may also be provided with a sparkless imperfect contact compensation circuit 9 between the outlet terminals 8 and the tool 60 so as to suppress a sudden change in current, as shown in FIG. 19. Therefore, a spark due to imperfect contact between the rollers 95 and the conductive rods 97 or the retainers 96 is not generated on the surface of the conductive rollers 95, and the life of the rollers 95 is remarkably prolonged. At the same time, noises due to sparking are prevented.

According to the embodiments of the present invention, even if the movable head is located at any position along the direction of movement of the movable head, the light emitted from one of the movable and fixed transceivers can be received by the other transceiver without the use of wiring. Therefore, the embodiments realize multidirectional communications even when the movable transceiver is moved. Since the optical path of the light is located within the area over which the movable head can be moved and where no disturbance is located, the transmission of light between the movable and fixed transceivers is not prevented by any object and the apparatus can be compact.

Although the present invention has been fully described in connection with the preferred embodiments thereof with reference to the accompanying drawings, it is to be noted that various changes and modifications will become apparent to those skilled in the art. Such changes and modifications are to be understood as included within the scope of the present invention as defined by the appended claims.

What is claimed is:

1. A cordless movable apparatus comprising:

a stage having a slide surface;

a movable head supported so as to be movable on the slide surface of the stage;

a processor supported by said movable head;

movable head driving means for driving the movable head along a direction of movement; and optical spatial transceivers, one of the transceivers being provided on the movable head and electrically connected to the processor, the other of the transceivers being provided on the stage, the transceivers being positioned spatially relative to one another so as to project and receive light propagating in the apparatus along an optical axis parallel to said direction of movement of the movable head, and each one of the transceivers including a light receiving unit comprising diffusion means for scattering the light projected from the other of the transceivers, a condenser lens condensing the scattered light, and a photodetector positioned to receive the condensed light.

2. The cordless movable apparatus as claimed in claim 1, and further comprising:

an air tank mounted to the movable head; and an air plug, mounted to the stage at a position at which the plug will communicate with the tank when the head is located at a predetermined position.

3. The cordless movable apparatus as claimed in claim 1, and further comprising two conductive bearings having a plurality of conductive rolling elements, two conductive retainers retaining the elements, attached to the head, and electrically connected to the processor, and two conductive rods attached to the stage and contacting the elements, wherein the rods will supply electricity to the retainers through the rolling elements when the rods are connected to an electric power supply.

4. The cordless movable apparatus as claimed in claim 1, wherein each of the transceivers also includes a light projecting unit comprising a semiconductor laser; and a semiconductor laser modulation circuit for controlling the laser.

5. A cordless movable apparatus comprising:

a first stage having a slide surface extending along a first direction;

a first movable head supported so as to be movable along the slide surface of the first stage in the first direction;

a processor supported by said first movable head;

first movable head driving means for driving the first movable head;

a second stage having a slide surface extending along a second direction intersecting the first direction;

a second movable head supporting the first stage and in turn supported so as to be movable along the slide surface of the second stage in the second direction;

second movable head driving means for driving the second movable head;

a first optical spatial transceiver provided on the first stage and electrically connected to the processing device;

a second optical spatial transceiver provided on the second stage; and a light guide provided on one of the first stage and the second movable head, the first optical spatial transceiver and the light guide being provided on an optical axis parallel to said first direction so as to transmit light therebetween, and the second optical spatial transceiver and the light guide being provided on an optical axis parallel to said second direction so as to transmit light therebetween, whereby signal transmission in a cordless manner is conducted between the first and second optical spatial transceivers through the light guide.

6. The cordless movable apparatus as claimed in claim 5, wherein the light guide is a reflecting mirror positioned to reflect light from one of the transceivers to the other.

7. The cordless movable apparatus as claimed in claim 5, wherein the light guide is a waveguide positioned to guide the light from one of the transceivers to the other.

8. The cordless movable apparatus as claimed in claim 5, wherein the second optical spatial transceiver has an aperture of a diameter larger than that of the first optical spatial transceiver.

9. The cordless movable apparatus as claimed in claim 5, wherein each one of the transceivers includes a light receiving unit comprising:

diffusion means for scattering light projected from the other of the transceivers;

a condenser lens condensing the scattered light; and a photodetector positioned to receive the condensed light.

10. The cordless movable apparatus as claimed in claim 9, wherein each of the transceivers includes a light projecting unit comprising:

a semiconductor laser; and a semiconductor laser modulation circuit for controlling the laser.

11. The cordless movable apparatus as claimed in claim 5, wherein each one of the transceivers has a light projecting unit and a light receiving unit, the light projecting unit comprising:

a plurality of light emitting elements arranged along an are of at least 90 degrees; and a modulating circuit for controlling the elements, the light receiving unit comprising:

a mirror having a region subtending an angle of at least 90 degrees so as to receive the light projected from the light emitting elements of the other transceiver;

a condenser lens for condensing the reflected light; and a photodetector positioned to receive the condensed light, wherein the region where the light emitting elements emit the light is always aligned with the region where the mirror receives the projected light.

12. The cordless movable apparatus as claimed in claim 5, and further comprising two conductive bearings having a plurality of conductive rolling elements, two conductive retainers retaining the elements, attached to the head, and electrically connected to the processor, and two conductive rods attached to the stage and contacting the elements, wherein the rods will supply electricity to the retainers through the rolling elements when the rods are connected to an electric power supply.

13. A movable apparatus comprising:

a stage;

a movable head supported so as to be movable on the stage;

movable head driving means for driving the movable head along the stage;

a processor supported by the movable head; and a cordless electric supply mechanism including two conductive bearings having a plurality of conductive rolling elements, two conductive retainers retaining the elements, attached to the head, and electrically connected to the processor, and two conductive rods attached to the stage and contacting the elements, wherein the rods will supply electricity to the retainers through the rolling elements when the rods are connected to an electric power supply.

* * * * *